United States Patent [19]

Hajek

[11] Patent Number: 4,723,444

[45] Date of Patent: Feb. 9, 1988

[54] APPARATUS FOR DETERMINING SIDE-SLIP CHARACTERISTICS OF A MOVING VEHICLE

[75] Inventor: Jaroslav Hajek, 1315 Ridgeland Ave., Berwyn, Ill. 60402

[73] Assignees: Jaroslav Hajek; Emil Ebert, both of Westchester, Ill.

[21] Appl. No.: 908,266

[22] Filed: Sep. 17, 1986

[51] Int. Cl.⁴ ............................................ G01M 17/02
[52] U.S. Cl. .......................................... 73/146; 73/8; 73/178 R
[58] Field of Search ...................... 73/146, 8, 9, 178 R, 73/105, 128

[56] References Cited

U.S. PATENT DOCUMENTS 2,290,618  7/1942  Bosomworth ...................... 73/146

FOREIGN PATENT DOCUMENTS 0582469  11/1977  U.S.S.R. ................................. 73/146

Primary Examiner—Donald O. Woodiel
Attorney, Agent, or Firm—Balogh, Osann, Kramer, Dvorak, Genova & Traub

[57] ABSTRACT

A test apparatus for measuring side-slip and gravity slip of a vehicle moving along a curved road or travelling across downhill. The test apparatus is adapted to be towed by a vehicle. The test apparatus is connected to a vehicle by a bar which has the other end connected to a vertically extending bushing which houses a pivot member extending perpendicularly to a riding surface. The lower end of the pivot member is connected pivotably to a wheel fork horizontally extending and supporting a test wheel in contact with a riding surface, while the other end of the pivot member extends out of the upper portion of the bushing and is connected by a horizontally extending level member which has the other end connected to a counterweight. An angle-measuring sensor is disposed over the upper end of the pivot member and is supported on a bracket secured to the upper end of the bushing. The moving portion of the sensor is connected to the upper end of the pivot member so that an angle measurement can be obtained between the bushing and the pivot member as the vehicle travels along a curved path. The level and the counterweight possess a mass which is equivalent to the mass of the wheel fork and the test wheel, thereby obtaining a static balance. A measuring device is secured to the wheel fork and is in frictional contact with the test wheel to take a measurement of distance. A further sensor is mounted over the test wheel axle, thereby aligning with the position of contact of the test wheel with the riding surface for measuring linear and centrifugal accelerations.

12 Claims, 4 Drawing Figures

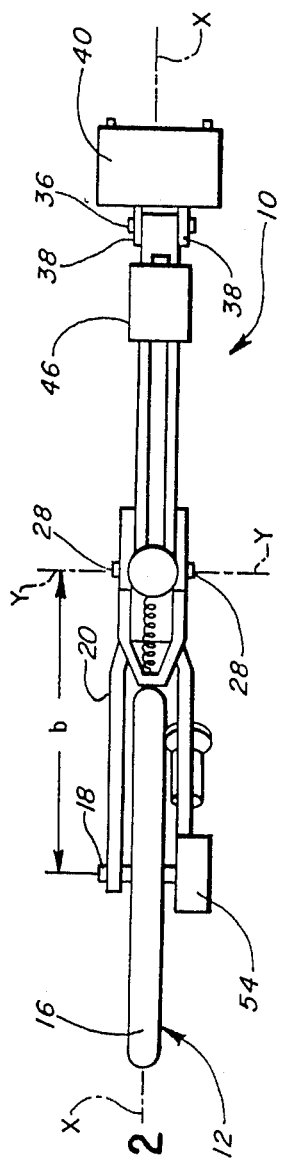
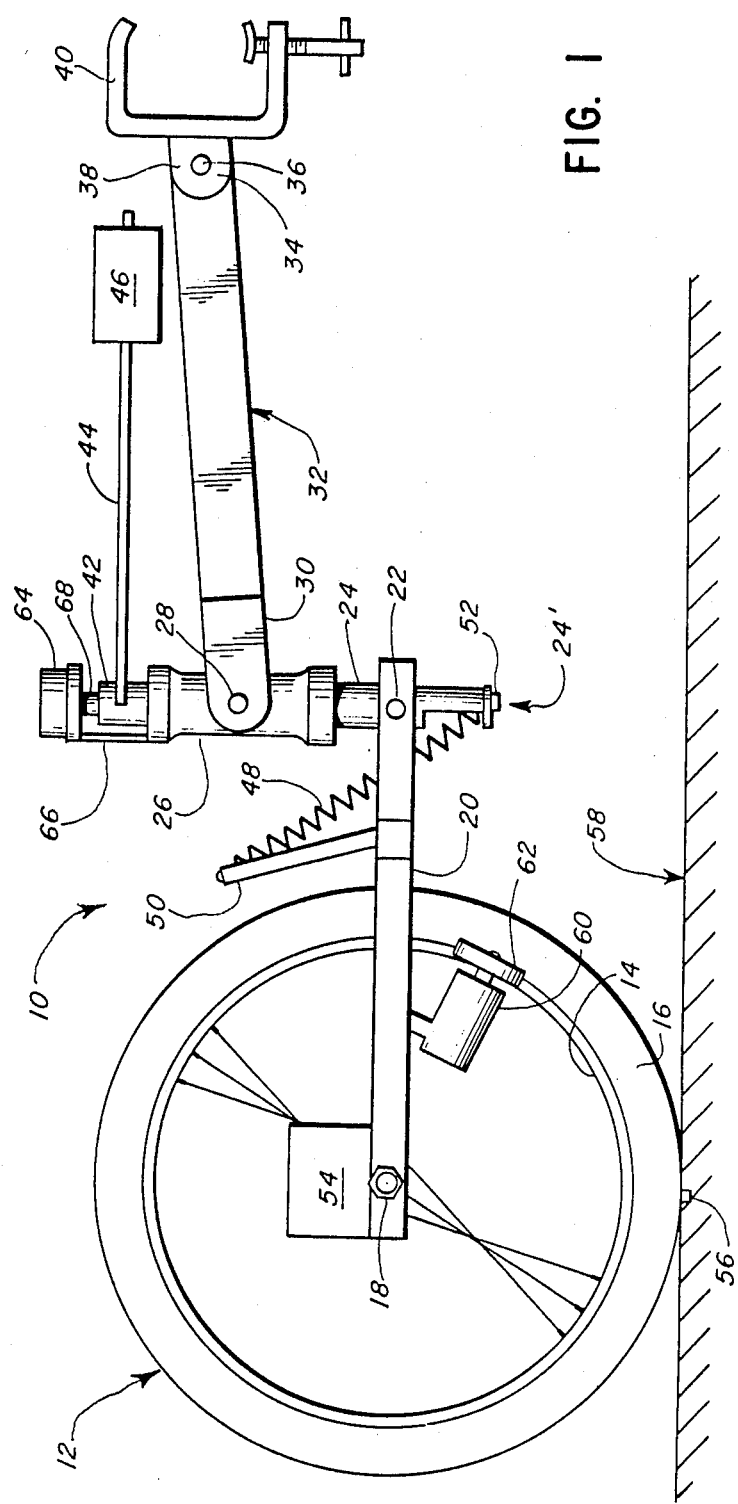
FIG. 1
FIG. 2

APPARATUS FOR DETERMINING SIDE-SLIP CHARACTERISTICS OF A MOVING VEHICLE

BACKGROUND OF THE INVENTION

1. Field of the Invention

This invention is generally concerned with apparatus which is attachable to a vehicle travelling over terrain for the purpose of taking measurements as to effect of motion and other forces upon a vehicle, and more particularly to an apparatus for measuring slide slippage characteristics of a vehicle itself in motion.

2. Description of the Prior Art

Various devices have been developed for use with a vehicle for obtaining measurements, such as distance. One of the oldest developments is an odometer described in U.S. Pat. No. 745,726, which was used for measuring a distance travelled by a vehicle to which the device was attached. Another form of portable apparatus for obtaining linear measurements of a vehicle is described in U.S. Pat. No. 2,580,538, which was used for measuring land area by obtaining various linear measurements.

Another form of a measurement device was described in U.S. Pat. No. 3,629,557, which discloses a yardage indicator which is attachable and trails a golf cart.

None of the foregoing devices for obtaining measurements are capable of determining side-slippage of a moving vehicle as caused by centrifugal force of the vehicle on a curve or gravity slippage while the vehicle moves across an incline.

SUMMARY OF THE INVENTION

A testing apparatus has been developed to measure the characteristics of a moving vehicle when subject to various forces. The apparatus has a pivoted bar with a testing wheel at one end, and a counter-balance weight at the other. The apparatus enables measurement: speed, immediate radius and center of the turning vehicle, and the angle between the center line of the vehicle and tangent of measured radius of wheel as well as other parameters of concern with respect to vehicle body handling determination and tire testing.

By using the readings obtained in the above steps 1, 2 and 3, it is possible to accurately calculate the side-slip of the vehicle wheels. The results which are obtained can be used for preparing a comparison chart of different vehicles or different tires.

Existing vehicle handling tests are provided on the basis of driver judgment and, therefore, cannot be considered as providing objective results. The testing apparatus may be used for any vehicle moving over terrain. The testing apparatus uses a test wheel for obtaining the following tests:

1. Immediate radius of turning rolling planes of vehicle wheels.
2. Angle developed between the rolling planes of vehicles wheels with their side-slip and rolling theoretical planes of wheels, that is, without activating side forces on the vehicle wheels.
3. The test wheel is provided with a measuring sensor of centrifugal and linear acceleration and is permanently positioned in a coordinate system, which consists from tangent and normal of immediate circle turning test wheel, which is able to measure both accelerations.
4. A speed measurement in direction of a tangent of the immediate circle turning of the test wheel.
5. Slippage measurements of the vehicle wheels.

Using the test results from steps 1, 2, 3, 4 and 5, it is possible to calculate the value of side slip for rolling planes of the vehicle wheels. These results can be used for a comparison chart of different vehicles or tires. Using front and rear test wheels, it is possible to exclude a device for measuring centrifugal acceleration.

To avoid the structure of the test wheel in effecting the readings taken of the moving vehicle, the test wheel is statically balanced along vertical and horizontal axes.

The primary object of the present invention is to provide a test apparatus for measuring quantitative data of a vehicle moving on a terrain.

Another object of the invention is to provide a testing apparatus for measuring side-slip of a vehicle moving along a curve.

A still further object of the invention is to provide a test apparatus for measuring relative movement of a vehicle moving along a declined terrain.

Another object of the invention is to provide an apparatus for determining the radius and center of a turning vehicle.

The foregoing objects, as well as other objects of the present invention, will become more readily apparent when reference is made to the following description and the accompanying drawings.

BRIEF DESCRIPTION OF THE DRAWINGS

FIG. 1 is a side view of a testing apparatus which is adapted to be attached to a vehicle;

FIG. 2 is a reduced plan view of the testing apparatus shown in FIG. 1;

DESCRIPTION OF THE PREFERRED EMBODIMENT

Figure 3:
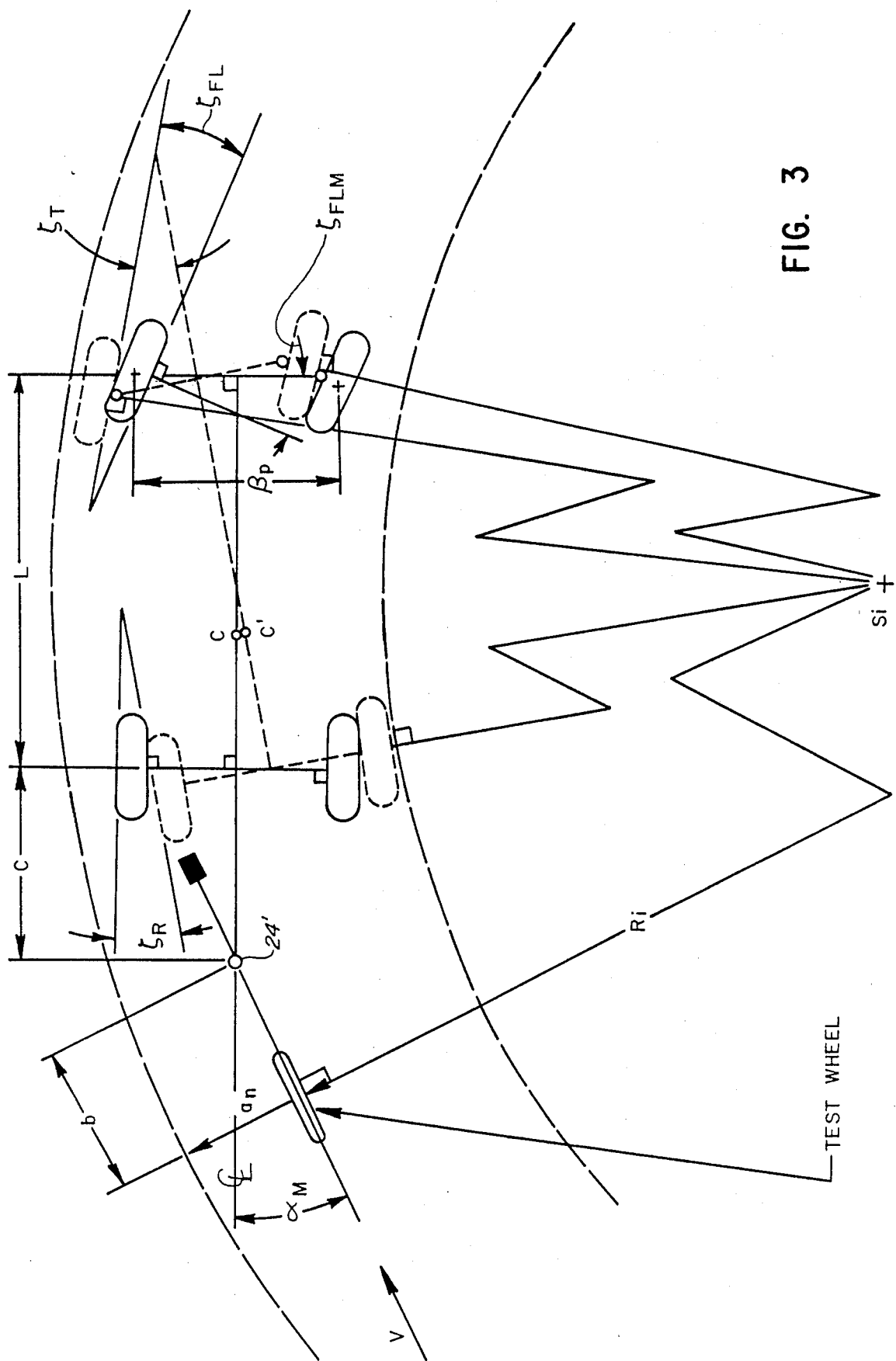
FIG. 3 is a diagrammatic illustration of a vehicle using one testing apparatus for measuring angular characteristics of the vehicle structure as it moves along a curved road.

Referring to FIGS. 1 and 2 in the drawings, there is illustrated a testing apparatus 10 employing a test wheel 12 having a rim 14 on which is mounted a tire 16. The test wheel 12 is rotatably supported on an axle 18 secured to the ends of a fork 20 which is pivotally mounted by a pin 22 on a vertically extending member 24 which is rotatably supported by a bushing 26 which is secured by a pair of pins 28 which extend outwardly out of the body of the bushing 26 and are engaged by opposed ends 30 of a bracket 32. The bracket 32 has one end 34 pivotally coupled by a pin 36 to a pair of ears 38 extending from a C-clamp 40 which can be secured appropriately, for example, to a bumper, of a vehicle.

The bracket 32 is adjustable by means of the bolts 36 and 28 to the clamp 40 and the bushing 26. The vertical extending member 24 defines a pivot which has to be adjusted perpendicular to the driving surface by the bolts 28 and 36. The vertically extending member 24 has an upper end 42 which supports a level 44 which assists in aligning the bracket 32 so that the vertically extending member 24 is perpendicular to the riding surface. The free end of the level 44 is equipped with a counterweight 46 which counterbalances the weight of the test wheel 12 along the axes X and Y, as shown in FIG. 2.

The test wheel 12 is biased toward the riding surface by a compressed spring 48 having one end connected to a lever 50 mounted on the fork 20 and the other end connected to a bottom 52 of the vertically extending member 24. A sensor 54 for measuring linear and centrifugal acceleration is mounted on the fork 22 directly over the axle 18 and in perpendicular alignment with a touching point 56 on a riding surface 58.

On the wheel fork 20, there is mounted a speed sensor 60 which has a wheel 62 frictionally contacting a side of the rim 14.

Another sensor 64 is secured by a bracket 66 to the top of the bushing 26, and a center portion of the sensor 64 is coupled to a top 68 of the vertically extending member 24. The sensor 64 provides a measurement of an angle turn between the vertically extending member 24 and the bushing 26.

The test wheel 12 and the wheel fork 20 are statically balanced via the pivot provided by axle member 24 or 24'. With this arrangement, it is possible to avoid side-slip of the test wheel 12. A side force, for example as generated by a centrifugal force, is not seized between the test wheel 12 and the riding surface 58, but is transmitted to the vehicle. The test wheel 12 has to be statically balanced to the axle X—X and axle Y—Y as shown in FIG. 2.

The side-slip angle of a rigid axle on a vehicle and the theoretical angle between the rolling plane of the left steering wheel and the center line of the vehicle can be calculated from the measurements taken with one test wheel towed by the vehicle.

Reference is now made to FIG. 3 which shows various linear and angular measurements obtained from the test apparatus and the vehicle towing the test apparatus. A mathematical equation will now be developed for determining the slip angle and the theoretical angle between the rolling plane of the left steering wheel and the center line of the vehicle.

Immediate Radius of turning - $Ri$ $$Ri = \frac{V^2}{an} \text{ with using centrifugal accelerator or}$$

using front and rear test wheels:

$$Ri = \frac{a \cdot \cos\alpha_M + b[1 + \cos(\alpha_M + \beta_M)]}{tg(\alpha_M + \beta_M)} + a \sin\alpha_M$$

Side's slip of rigid axle:
$$\phi_R = \alpha_M - \alpha$$

$$\phi_R = \alpha_M - \arcsin\left[\frac{1}{Ri^2 + b^2}(b \cdot \sqrt{Ri^2 + b^2 - c^2} + C \cdot Ri)\right]$$

Side's slip of steering wheel — left wheel
$$\phi_{FL} = \phi_{FLM} - \phi_T$$

$$\phi_{FL} = \phi_{FLM} + \alpha_M - 90° + \arctan\left[\frac{(Ri + L - c)\sin\alpha_M + \frac{\beta_p}{2}\cos\alpha_M}{(b + c + L)\sin\alpha_M + \frac{\beta_p}{2}\cos\alpha_M}\right]$$

The similar equation is true for the right steering wheel.

| Legend: | |
|---|---|
| a... | distance between pivots 24' on front and rear test wheels in plan view (FIG. 4) |
| $an$... | centrifugal acceleration on circle immediate radius |
| b... | distance between touching point of wheel 56 and axle pivot 24' in plan view |
| c... | distance between pivot 24' and rigid axle X in plan view |
| V... | speed on circle immediate radius |
| Bp... | steering wheel spacing |
| L... | wheel base |
| Ri... | immediate turning radius of a test wheel taken from touching point 56 |
| $\alpha$... | theoretical angle between longitudinal center line of vehicle (with asymmetrical or staggered wheel vehicle, we take wheel rolling plane of rigid axle) and rolling plane of test wheel |
| Measured $\alpha$ M... | measured angle between longitudinal center line of vehicle and test wheel rolling plane |
| Measured $\beta$... | theoretical angle between longitudinal center line of vehicle and front test wheel rolling plane |
| Measured $\beta$ M... | measured angle between longitudinal center line of vehicle and front test wheel rolling plane |
| Calculated $\phi$ FL... | side slip angle of left steering wheel |
| Measured $\phi_{FLM}$ | measured angle between steering wheel axle and rolling plane of steering wheel |
| Calculated $\phi$ R... | side slip angle of rigid axle |
| Calculated $\phi$ T... | theoretical angle between rolling plane left steering wheel and center line of vehicle |

The sensors 54, 60 and 64 are commercially available.

Figure 4:
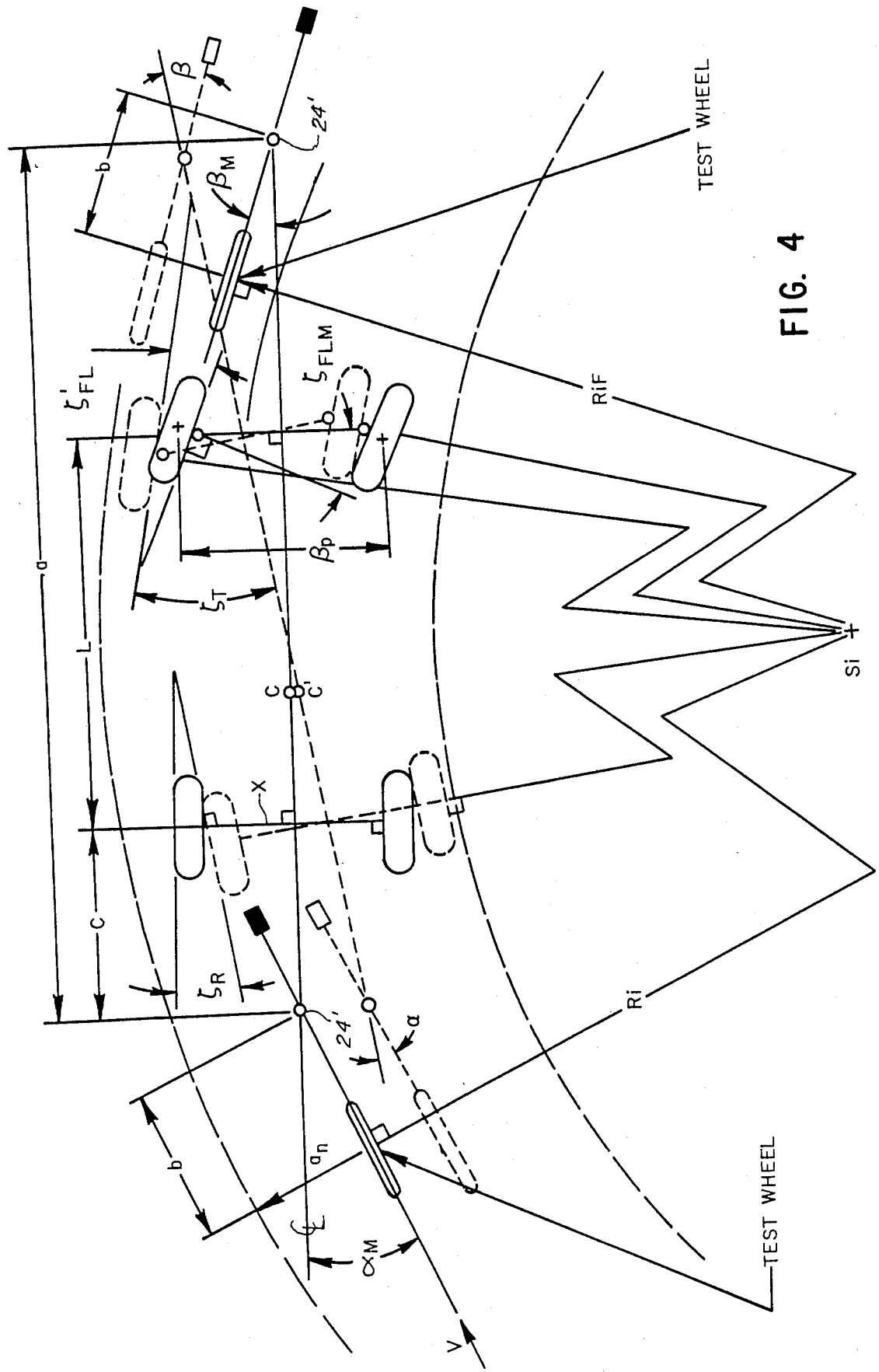
FIG. 4 is a diagrammatic illustration of a vehicle which is provided with two testing apparatus, one in front and one in the rear, and the angular measurements associated with the vehicle moving along a curved road.

Referring to the diagram illustrated in FIG. 4, there is shown a diagrammatic representation of a vehicle equipped with a rear test wheel and a front test wheel for the purpose of measuring side slippage of all the wheels of a vehicle travelling along a curved path. The mathematical symbols employed with the discussion and illustration of the diagram shown in FIG. 3 are similar to the illustration shown in FIG. 4, and need not be discussed further.

The above description sets forth embodiments of the present invention which achieve the desired advantages and objectives thereof, but are presented for illustrative purposes only. It will be apparent to those skilled in the art that variations and modifications can be made to the specific embodiments described without departing from the spirit or the scope of the invention. Therefore, it is the intent that the present invention not be limited by the specific disclosure herein, but only by the appended claims.

What is claimed is:

1. A test apparatus for attachment to a vehicle for measuring motion characteristics of the travelling vehicle, comprising an arm pivoted on a vehicle frame, a pivot member coupled to the other end of said arm, a riding surface engaging test wheel mounted on a wheel fork and pivotally coupled to said pivot member, a counter balancing weight coupled to said pivot member and disposed above said arm to statically balance, via said pivot member, said test wheel and said wheel fork, and instrument means for measuring the angle between said arm and the path traveled by said test wheel.

2. A test apparatus according to claim 1, including a linear measurement device attached to said wheel fork and cooperatively engaged with said test wheel.

3. A test apparatus according to claim 1, wherein said counterbalancing weight is coupled by a leveling device to said pivot member, whereby said leveling device determines perpendicularity of said pivot member with respect to said riding surface.

4. A test apparatus according to claim 1, including means for adjustably positioning said arm with respect to said pivot member so that said pivot member is rigidly secured by said arm to said vehicle.

5. A test apparatus according to claim 1, including means associated with said wheel form and said pivot member for biasing said test wheel toward the riding surface.

6. A test apparatus for attachment to a vehicle for measuring motion characteristic of the moving vehicle, comprising an arm having one end connectible to said vehicle, a vertically extending bushing secured to the other end of said arm, a rotatably supported pivot member extending through said bushing, one extending end of said pivot member pivotably connected to a horizontally extending wheel fork, a test wheel rotatably positioned in said wheel fork and engaging a riding surface, a level extending horizontally over said arm and having one end secured to the other extending end of said pivot member, a weight secured to the other end of said level, and an angle sensor supported by a bracket above the upper end of said bushing and coupled to the upper end of said pivot member.

7. A test apparatus according to claim 6, including means for rigidly immobilizing said arm and said bushing with respect to the longitudinal axis of said vehicle and establishing perpendicularity of said bushing to the riding surface.

8. A test apparatus according to claim 7, said means comprising a C-clamp adjustably connected by a bolt to one end of said arm, the other end of said arm having fork arms, a pair of threaded studs extending exteriorly of said bushing and adapted to engage said fork arms, and nut members to secure adjustably said arm to said bushing.

9. A test apparatus according to claim 6, including a linear measuring device secured to the wheel fork adjacent the outer periphery of said test wheel for measuring the revolutions of the test wheel.

10. A test apparatus according to claim 6, including a compression spring having one end coupled to said wheel fork and the other end secured to the lower end of said pivot member for biasing said test wheel toward the riding surface.

11. A test apparatus according to claim 6, wherein the mass of said level and weight counterbalance the mass of said test wheel and said wheel fork.

12. A test apparatus according to claim 6, including a sensor mounted on said wheel fork directly over an axle supporting said test wheel for measuring true linear and centrifugal accelerations.

* * * * *